United States Patent
McIntyre

(10) Patent No.: US 6,690,478 B1
(45) Date of Patent: Feb. 10, 2004

(54) METHOD AND APPARATUS FOR UTILIZING MULTIPLE VERSIONS OF A PAGE DESCRIPTOR LANGUAGE

(75) Inventor: C. Kevin McIntyre, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/364,538

(22) Filed: Jul. 29, 1999

(51) Int. Cl.[7] .............................. G06F 3/12; G06F 13/00

(52) U.S. Cl. ..................................... 358/1.13; 358/1.15

(58) Field of Search ..................... 358/1.1, 1.9, 1.13, 358/1.15, 1.18, 524, 401, 403, 501, 504

(56) References Cited

U.S. PATENT DOCUMENTS

| | | | | | |
|---|---|---|---|---|---|
| 5,828,817 A | * | 10/1998 | Landau | ........................ | 395/112 |
| 5,970,216 A | * | 10/1999 | Tanio et al. | ................. | 395/112 |
| 5,984,446 A | * | 11/1999 | Silverbrook | .................. | 347/3 |

* cited by examiner

*Primary Examiner*—Gabriel Garcia
*Assistant Examiner*—Douglas Tran

(57) ABSTRACT

A method for selecting a device personality is presented comprising registering each of a plurality of revisions of one or more accessible personalities, wherein each personality is configured to convert incoming data from a particular language to a low-level data stream. Once registered, appropriate personality revisions are dynamically selected to convert the incoming data, while retaining all registered revisions of the one or more personalities for subsequent use.

7 Claims, 4 Drawing Sheets

| Personality Name 202 | Revision Code 204 |
|---|---|
| PDL_name1 | 1232.02.17.99 |
| PDL_name1 | 1512.05.03.96 |
| PDL_name2 | 1010.09.17.98 |
| PDL_name2 | 1353.06.10.97 |
| PDL_name2 | |

206 { (first two PDL_name1 rows)
208 { (three PDL_name2 rows)

112

| Personality Name 202 | Revision Code 204 |
|---|---|
| PDL_name1 | 1232.02.17.99 |
| PDL_name1 | 1512.05.03.96 |
| PDL_name2 | 1010.09.17.98 |
| PDL_name2 | 1353.06.10.97 |
| PDL_name2 | |

206 { first two rows }
208 { last three rows }

112

312

FROM 310

→ 402 DETERMINE REVISION OF INCOMING DATA

→ 404 COMPARABLE REVISION OF PDL AVAILABLE?

No → 406 SELECT LATEST PDL REVISION

Yes → 408 SELECT COMPARABLE REVISION OF PDL

To 314

METHOD AND APPARATUS FOR UTILIZING MULTIPLE VERSIONS OF A PAGE DESCRIPTOR LANGUAGE

FIELD OF THE INVENTION

This invention relates to imaging systems in general and, in particular, to effectively managing and utilizing multiple versions of a page descriptor language (PDL, also referred to as a personality) within an imaging system.

BACKGROUND OF THE INVENTION

When printing a document, a host computer first translates the document from a particular high-level language that the host application understands to one that the imaging system (e.g., ink-jet printer, laser printer, pen plotter, etc.) understands. By proper use of the imaging system language, the host computer instructs the imaging system what to print and how to print it. In a modern printing environment, there are a number of imaging system languages, also commonly referred to as page descriptor languages (PDL) or personalities, available to a user.

A personality, which is typically implemented as a software/firmware module in an imaging system subsystem, embodies the necessary instructions to properly accept incoming data in a particular language and convert that representation to a data stream used by a print engine of the imaging system to print a page. Accordingly, the personality is responsible for such tasks as accepting and storing downloaded fonts, selecting and deselecting printer settings, giving feedback to the host (e.g., computer system, printer server, etc.) on the status of a printer job, and so forth.

Typically, an imaging system is implemented with the personality of the manufacturer. For example, Hewlett-Packard Company uses a personality in its line of imaging systems based on its PCL™ printer language. More specifically, PCL™ is a page description language (PDL): the data stream describes what the page should look like and prints the page when it is complete.

Some imaging systems support multiple personalities, allowing the user to use the same printer with a variety of applications and hardware. Examples of other languages include the ESC/P™ language from Seiko Epson Kabushiki Kausha, and the PostScript™ language from Adobe Systems, Inc.

Each personality uses resources of the imaging system to execute a print job. Such resources include RAM (Random Access Memory), ROM (Read Only Memory), hard disk, I/O channels, control panel, paper trays, and print engine. The personalities may share printer resources or partition the resources in such a way that there is minimal interaction between the multiple personalities.

Like most software/firmware, imaging system personalities are updated periodically to remove defects from prior versions and/or to add enhancements to the personality. The typical consumer endeavors to make sure that the most recent personality is installed and available for use on their imaging system. As user's load these updated personalities onto their system, the result is that multiple revisions of the same personality may reside within the system. Thus, a problem of personality revision management within imaging systems arises.

One prior art solution to this problem is to simply remove "old" versions of a personality when a new revision is installed. One problem associated with this solution is that certain features and functions of a personality may not be carried through subsequent revisions of a personality or, if they are, the function calls invoking such features or functions may change in subsequent revisions to the personality.

Another prior art solution to personality management is to leave the prior revisions resident within the imaging system, but to only boot/load the latest revision of a personality when the personality is called. This solution, however, suffers from the same limitation as above, with the added problem that the prior revisions of the personality are needlessly occupying a system resource.

Thus, a system and method which enables an imaging system to utilize all accessible personalities, regardless of revision level, is desired unencumbered by the limitations commonly associated with the prior art. Just such a solution is provided herein.

SUMMARY OF THE INVENTION

In accordance with the teachings of the present invention, a system and method for registration and selection of multiple page descriptor languages (i.e., personalities) is presented. More specifically, in accordance with one example implementation, a method for selecting a device personality is presented comprising registering each of a plurality of revisions of one or more accessible personalities, wherein each personality is configured to convert incoming data from a particular language to a low-level data stream. Once registered, appropriate personality revisions are dynamically selected to convert the incoming data, while retaining all registered revisions of the one or more personalities for subsequent use.

According to one exemplary implementation of the present invention, a printer implementing the method introduced above will selectively invoke a personality revision based, at least in part, on the data type and/or date stamp of the registered personality. These and other aspects and advantages of the present invention will become clear to those skilled in the art based on the description to follow.

DETAILED DESCRIPTION OF THE PREFERRED EMBODIMENT

Figure 1:
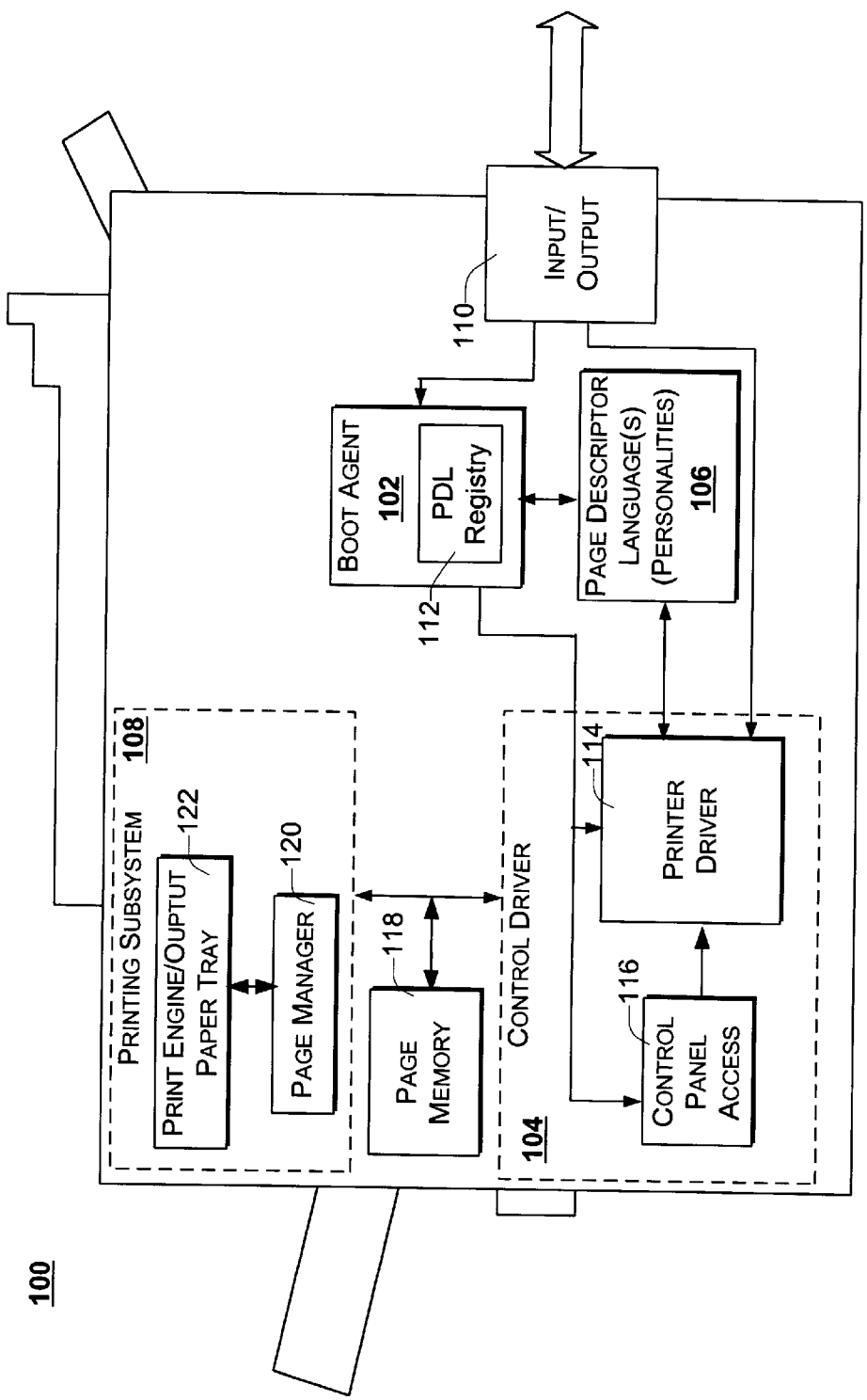
FIG. 1 graphically illustrates an example imaging system with a block diagram of an imaging subsystem to manage multiple versions of one or more personality types, according to one embodiment of the invention.

FIG. 1 provides a graphical illustration of imaging system 100 depicting select functional elements of an imaging subsystem to effectively manage multiple versions of one or more imaging system personalities, according to one embodiment of the present invention. In the illustrated exemplary embodiment, imaging system 100 is a laser printer, although, it will be apparent from the description to follow that the invention is not so limited. That is, this invention may well be implemented in other types of imaging systems, such as inkjet printers, pen plotters, and the like. Indeed, it will be evident from the description to follow that the invention is particularly well suited to any device having multiple versions of firmware/software.

As shown, imaging system 100 includes boot agent 102, control driver 104, one or more page descriptor languages (PDL's, or personalities) 106, a printing subsystem 108 and an input/output interface 110, each coupled as depicted. In general, imaging system 100 receives instructions in a high level language (e.g., application language) from a remote device via input/output interface 110, whereupon control driver 104 selectively invokes an appropriate version/revision of a PDL 106 to convert the received instructions into a printer dependent data stream interpreted by printing subsystem 108 to produce an output page. While prior art imaging systems simply invoke the latest (or only available) version of a PDL, the innovative boot agent 102 registers each of a plurality of versions of each PDL, making them available for subsequent selective invocation by control driver 104. Thus, boot agent 102 and control driver 104 effectively manage multiple revisions/versions of one or more imaging systems to accurately convert incoming data with an appropriate version/revision of a PDL.

Innovative boot agent 102 is invoked by imaging system 100 during an initialization event such as, for example, a power-up or restart of imaging system 100. In general, boot agent 102 manages the boot process if the imaging system 100 including, in part, the registration of page descriptor languages (PDLs) 106. That is, in addition to other typical initialization functions, boot agent 102 identifies each of a plurality of page descriptor languages 106, and records them within PDL registry 112. Unlike prior art imaging systems, boot agent 102 identifies and registers each version/revision of one or more PDL's 106 for subsequent use by imaging system 100. Thus, according to one aspect of the present invention, PDL registry 112 contains a list of every personality available to imaging system 100 including revision number, version date, and the like. One example of PDL registry 112 is presented with reference to FIG. 2.

Figures 2, 4:
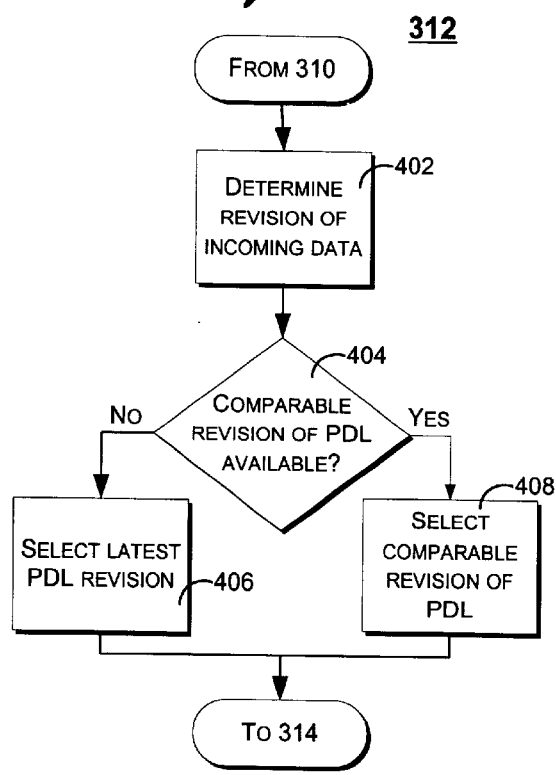
FIG. 2 graphically illustrates an example personality registry used by the innovative boot agent of the example imaging system depicted in FIG. 1.
FIG. 4 illustrates a flow diagram of an example method for selecting one of multiple versions of an imaging system personality, according to one embodiment of the invention.

Turning briefly to FIG. 2, an example data structure is illustrated depicting PDL registry 112 including a listing of every PDL available to (i.e., locally or from a remote source) imaging system 100, in accordance with one embodiment of the present invention. According to one aspect of the present invention, PDL registry 112 maintains information including the personality name 202 denoting the type of personality, and a revision code 204 for each instance of a personality type, for each of the PDL's 106 available to imaging system 100. For illustrative purposes, PDL registry 112 is shown in FIG. 2 depicting two personality types, PDL_namel 206 and PDL_name2 208, each with a plurality of revisions. It is to be appreciated that each provider of imaging system personalities may utilize different version/revision codes. In one embodiment of the present invention, boot agent 102 utilizes the revision/version code supplied by the provider of the PDL as its revision code 204. In an alternate embodiment, for consistency, boot agent 102 determines a date for the particular revision and uses the date of the revision as revision code 204. As shown, for example, the revision code 204 for each of PDL's 206 and 208, respectively, denote the time and date of the particular revision in the format of:

$$\text{Military\_time.month.day.year} \qquad (1)$$

Certainly, other suitable revision codes may be used without departing from the spirit and scope of the present invention. Accordingly, unlike prior art systems which registered only one revision of a particular personality type, innovative boot agent 102 registers and maintains access to each revision of one or more personalities in PDL registry 112 for subsequent invocation by control driver 104.

Control driver 104, generally speaking, manages the printing process of imaging system 100. As shown, control driver 104 includes printer driver 114 and control panel access/interface 116, coupled as shown. Printer driver 114 analyzes the received instructions and selectively invokes an appropriate one of the multiple versions of a PDL registered within PDL registry 112 to convert the received instructions from the high-level language to a printer dependent data stream used by printing subsystem 108 to place dots (or picture elements (pixels)) on the output page. As shown, page memory 118 is operatively coupled between and accessible by both control driver 104 and printing subsystem 108, to enable control driver 104 to convert data for use by printing subsystem 108 with limited regard for the speed at which printing subsystem produces an output page. That is, page memory 118 buffers the data stream from control driver 104 to printing subsystem 108, as necessary. As used herein, an "appropriate" personality is one that will effectively convert the received instructions into the printer dependent data stream and is, in this regard, dependent upon the language of the received instructions.

The personality invoked by printer driver 114 receives input data from input/output interface 110, interrogates the system state, obtains the installed print resources (such as fonts), and outputs printer dependent page descriptions. Each personality defines a set of objects containing instructions on how to draw a particular item or shape on a page. Common object types include text, rules (i.e., rectangles), vectors, polygons, and raster. Thus, the selected personality processes the received instructions according to objects defined within its operation table to create the low-level data stream. Upon completion of the print job for which the personality is selected, it may be deselected in favor of a default personality. Alternatively, the selected personality may remain resident until it is displaced by another personality in response to receiving a subsequent print job.

As introduced above, the data stream produced by control driver 104 is sent to and interpreted by printing subsystem 108 to produce the output page. As shown, printing subsystem 108 includes page manager 120 and the print engine/output paper tray. As alluded to above, printing subsystem 108 produces the output page in response to the data stream received from control driver 104. In this regard, page manager 120 controls the flow of data received from control driver 104 based on the ability (e.g., speed) of print engine 122 to print and deliver the output page to the output tray.

Figure 3:
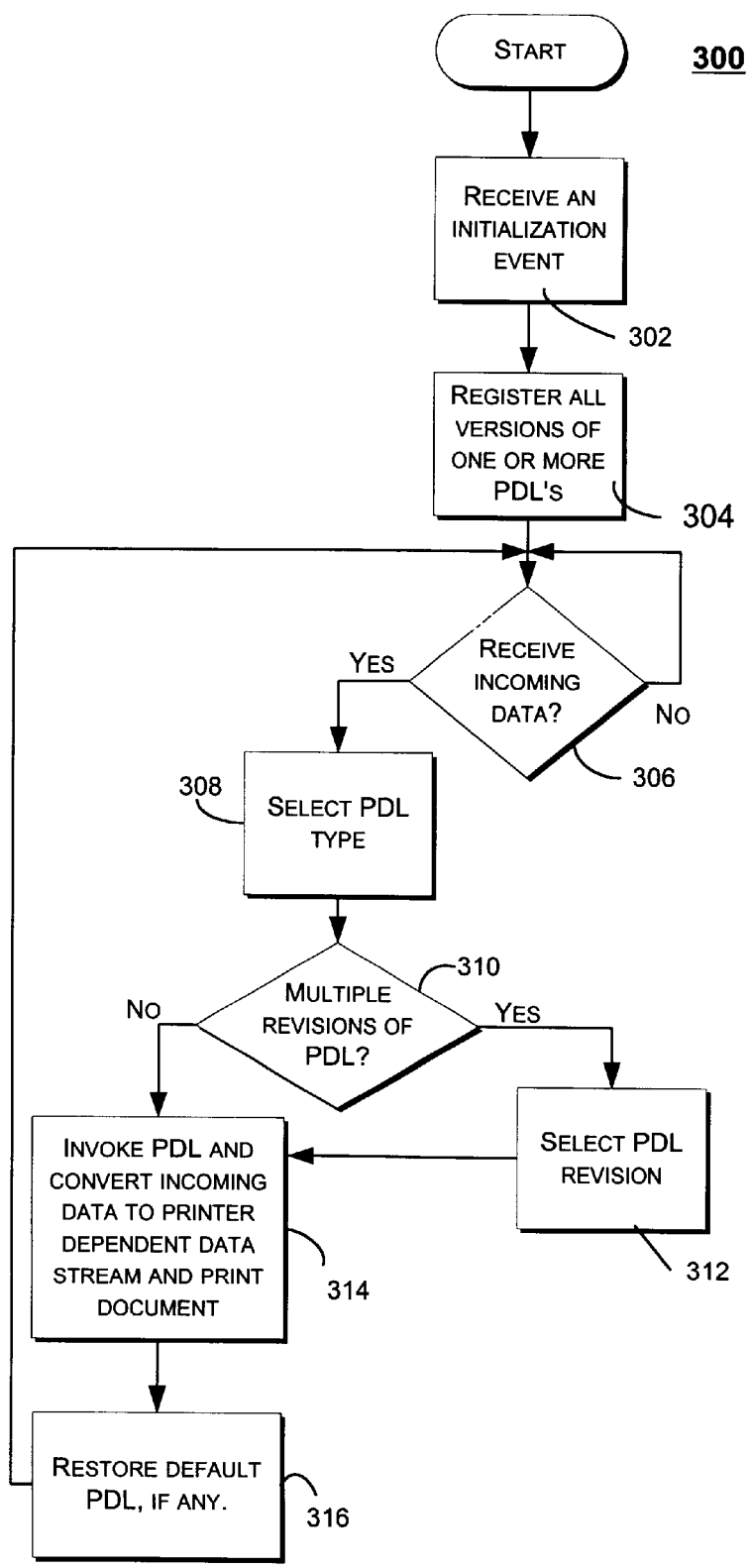
FIG. 3 illustrates a flow diagram of an example method for managing multiple versions of one or more personality types within an imaging system, according to one embodiment of the invention.

Having introduced the functional elements of example imaging system 100 incorporating the teachings of the present invention to effectively manage a number of versions/revisions of one or more system personalities with respect to FIGS. 1 and 2, an example method of operation will now be developed with reference to FIGS. 3 and 4. For ease of explanation, and not limitation, the method of FIGS. 3 and 4 will be developed with continued reference to the example imaging system and PDL registry of FIGS. 1 and 2, respectively.

FIG. 3 illustrates a flow diagram of an example method for managing multiple versions of one or more personality types within an imaging system, according to one embodiment of the invention. As shown, the method of FIG. 3 begins upon receipt of an initialization event, which invokes an instance of the innovative boot agent 102, block 302. As described above, among other boot tasks, innovative boot agent registers all versions of one or more PDLs 106 in PDL registry 112, block 304. As shown in FIG. 2, the PDL registry includes not only the personality name 202 (typical of prior art registries), but also a revision code 204 to distinguish multiple versions of the one or more registered PDL's. Thus, innovative boot agent 102 and PDL registry 112 make each of a plurality of revisions of one or more PDL's available to the imaging system for subsequent, selective invocation.

In block 306, upon completion of the boot process described above, imaging system 100 awaits receipt of incoming data. Once incoming data has been detected, control driver selects a PDL type from PDL registry 112. More specifically, printer driver 114 selects a PDL type from PDL registry 112 corresponding to the detected incoming data, block 306. In certain implementations, the PDL type required is provided within a header of the incoming high-level language. In alternate implementations, printer driver 114 must analyze the content of the incoming data to identify a PDL type within PDL registry 112 that is appropriate to convert the incoming data. In yet another embodiment, the PDL type is dictated by an entry at the control panel 116.

In block 308, printer driver 114 determines whether multiple versions/revisions of the selected PDL type are available. If only one PDL version is available, printer driver 114 invokes an instance of selected PDL to convert the incoming data to a printer dependent data stream suitable for the printing subsystem 108, as described above, and begins to buffer the data stream in page memory 118 for provision to printing subsystem 108, block 314. If in block 310, however, printer driver 114 identifies multiple versions of a particular PDL within PDL registry 112, printer driver 114 attempts to automatically select an appropriate version/revision of the PDL, block 312. One example method for automatically selecting an appropriate PDL version/revision is presented with reference to FIG. 4.

Turning to FIG. 4, a flow diagram of an example method for selecting one of multiple versions of an imaging system personality is presented, according to one embodiment of the invention. As shown, the method begins with block 402 wherein printer driver 114 attempts to determine a revision code, such as a date code, for the incoming high-level language. In one embodiment, for example, a revision code is embedded within the incoming data stream as overhead, which is readily detected by printer driver 114. In an alternate embodiment, printer driver 114 analyzes the content of the incoming data stream for revision information. If printer driver 114 cannot determine a revision code for the incoming data stream, printer driver 114 may prompt the user, i.e., via control panel 116, to select the PDL version to be used. In an alternate implementation, printer driver 114 may well select a default version, e.g., the latest version, of the PDL to use.

In block 404, printer driver 114 determines whether a comparable revision of the PDL type is available. In one implementation, printer driver 114 accesses PDL registry 112 to identify a version of the PDL that most closely matches that of the incoming data. As above, printer driver 114 makes this determination by comparing the revision code of the incoming data against the revision codes 204 of the one or more PDLs 206 and 208 resident within PDL registry 112. It is to be appreciated that exact matches are not necessary. Rather, printer driver 114 searches for a PDL version which existed on or before the identified revision of the incoming data, giving printer driver 114 the best chance of selecting that PDL intended for use in accordance with the high-level language.

If printer driver 114 cannot identify a comparable revision of the PDL, or if none exists, printer driver selects the latest PDL revision, block 406, and the process continues with block 314.

If, however, printer driver 114 does identify a comparable PDL revision within PDL registry 112, printer driver selects this appropriate version of the PDL type in block 408, and the process continues with block 314.

In block 314, printer driver 114 selectively invokes the appropriate version of the selected PDL and converts the incoming data stream into a printer dependent data stream, as described above. The printer dependent data stream is supplied to printer subsystem 108, via page memory 118 as necessary, to produce the printed output.

Upon completion of the print job, printer driver 114 restores a default PDL, if one is identified within PDL registry 112, and imaging system 100 awaits another print job as the process continues with block 306.

Figure 5:
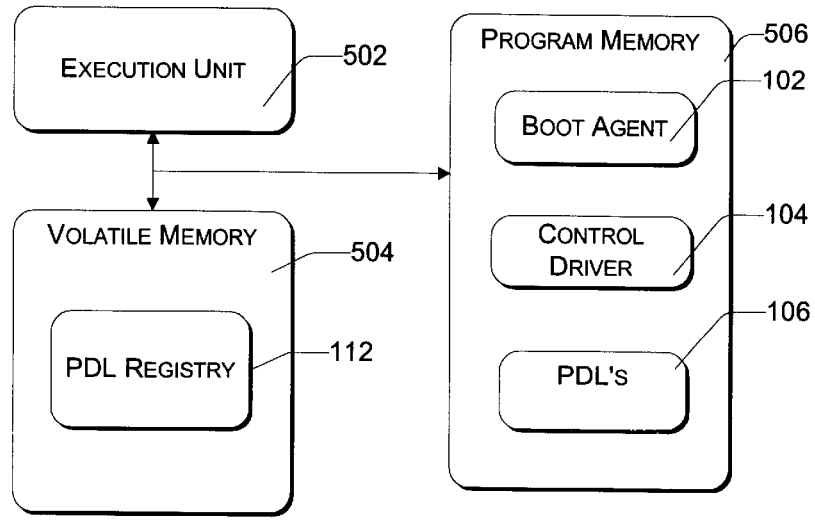
FIG. 5 illustrates a block diagram of an example imaging subsystem incorporating the teachings of the present invention, according to an alternate embodiment of the invention.
Figure 6:
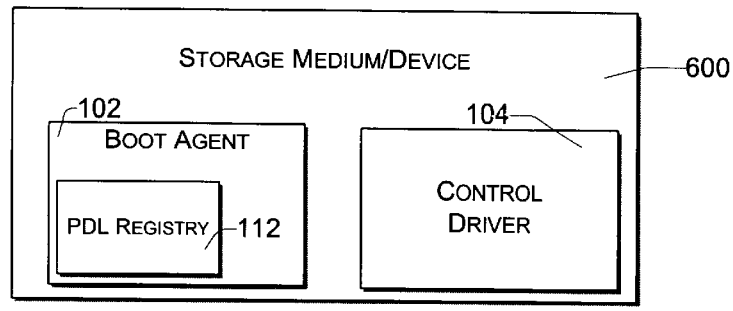
FIG. 6 illustrates a storage medium/device incorporating a plurality of executable instructions to implement the boot/registration agent of the present invention, according to yet another embodiment of the present invention.

Having introduced the teachings of the present invention above, with reference to imaging system 100 in FIGS. 1–4, alternate embodiments of the present invention will be presented with reference to FIGS. 5 and 6.

FIG. 5 illustrates a block diagram of an example imaging subsystem incorporating the teachings of the present invention implemented as an integrated imaging subsystem 500, in accordance with an alternate embodiment of the present invention. As shown, imaging subsystem 500 has an execution unit 502, a volatile memory 504 (i.e., RAM), and a non-volatile program memory 506 (e.g., ROM, Flash).

As depicted in FIG. 5, executable instructions to implement instances of innovative boot agent 102 and control driver 104 are stored in program memory 506. In addition, executable instructions associated with multiple versions of one or more PDLs 106 are also stored in program memory 506. The instructions to implement the innovative boot agent 102, the control driver, and the multiple versions of one or more PDL's 106 can be independently loaded during or after the process of manufacturing subsystem 500.

During an initialization event of imaging subsystem 500, execution unit 502 invokes an instance of the innovative boot agent 102, described above, to populate PDL registry 112 with a listing of each version of the one or more PDL's 106 available to imaging subsystem 500, thereby registering PDLs 106 for use by instances of control driver 104. Upon receipt of incoming data, execution unit 502 invokes an instance of control driver 104 to manage the printing process. As described above, control driver 104 selectively invokes an appropriate personality revision in accordance with the innovative method described in FIGS. 3 and 4 to convert the incoming data into a printer dependent data stream. Execution unit 502 of image subsystem 500 passes the printer dependent data stream generated by control driver 104 to a printing subsystem of a host imaging system (not shown).

As used herein, imaging subsystem 500 may well be implemented in an integrated circuit such as, for example, an application specific integrated circuit (ASIC), programmable logic array (PLA), microcontroller, microprocessor, processor, micromachine and the like. Accordingly, the implementation described with respect to FIG. 5 is provided to explain possible alternative implementations of the present invention. It is to be appreciated that the imaging subsystem, or select elements thereof, may well be implemented in software stored within a storage medium/device. Just such an implementation is depicted with reference to FIG. 6.

FIG. 6 illustrates a storage medium/device having stored thereon a plurality of executable instructions including instructions to implement the teachings of the present invention, according to yet another embodiment of the present invention. In general, FIG. 6 illustrates a storage medium/device 600 having stored thereon a plurality of instructions including at least a subset of which that, when executed by a host system, implement the innovative boot agent 102, PDL registry 112 and control driver 104 of the present invention. That is, when executed by a processor of a host imaging system, the subset of executable instructions implementing innovative boot agent 102, PDL registry 112 and control driver 104 effectively manage the registration and selective invocation of any of a number of revisions of one or more imaging system personalities available to the host imaging system, in accordance with the teachings of the present invention.

As used herein, storage medium 600 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, extensible Markup Language (XML), and the like. Moreover, it is to be appreciated that the storage medium/device 600 need not be co-located with the imaging system. That is, storage medium/device 600 may well reside within a remote server communicatively coupled to and accessible by the executing imaging system. Accordingly, the software implementation of FIG. 6 is to be regarded as illustrative, as alternate storage media and software embodiments are anticipated within the spirit and scope of the present invention.

Accordingly, the invention has been described in language more or less specific as to structural and methodical features. It is to be understood, however, that the invention is not limited to the specific features described, since the means herein disclosed comprise preferred forms of putting the invention into effect. Although the teachings of the present invention have been described within the context of an imaging system, those skilled in the art will appreciate that the teachings of the present invention may well be practiced in a myriad of electronic devices without deviating from the spirit and scope of the present invention. The invention is, therefore, claimed in any of its forms or modifications within the proper scope of the appended claims appropriately interpreted in accordance with the doctrine of equivalents.

What is claimed is:

1. A method for selecting a device personality, the method comprising:

registering each of a plurality of revisions of one or more accessible personalities, each personality configured to convert incoming data from a particular language to a low-level data stream, wherein the registering comprises:
accessing each of the plurality of revisions of the one or more personalities from communicatively coupled data resources; and
documenting the accessibility of each of said plurality of revisions of the one or more personalities in a personality list; and dynamically selecting a personality revision to convert the incoming data, while retaining all registered revisions of the one or more personalities for subsequent use, wherein the dynamically selecting comprises:
determining whether an appropriate personality is accessible;
determining whether the multiple revisions of the appropriate personality are accessible; and
selecting the appropriate personality with a revision date stamp closely approximating a date stamp of the incoming data, if multiple revisions of an appropriate personality exist.

2. The method of claim 1, further comprising:

invoking the selected personality revision to convert the incoming data; and invoking a default personality upon completion of the conversion.

3. The method of claim 1, wherein determining whether an appropriate personality exists is based, at least in part, on a data type of the incoming data.

4. The method of claim 1, wherein dynamically selecting a personality is based, at least in part, on a data type of the incoming data.

5. The method of claim 1, wherein selecting a personality comprises:

identifying an appropriate personality from the one or more personalities;

identifying that a plurality of revisions of the appropriate personality exist; and prompting a user to select one of the plurality of revisions of the appropriate personality.

6. The method of claim 5, further comprising invoking the user selected revision of the appropriate personality to convert the incoming data.

7. A computer readable storage medium having stored thereon a plurality of executable instructions which, when executed, implement the method of claim 1.

* * * * *